E. F. Gilbert,
Bedstead Fastener.
No. 108,472.        Patented Oct. 18, 1870.
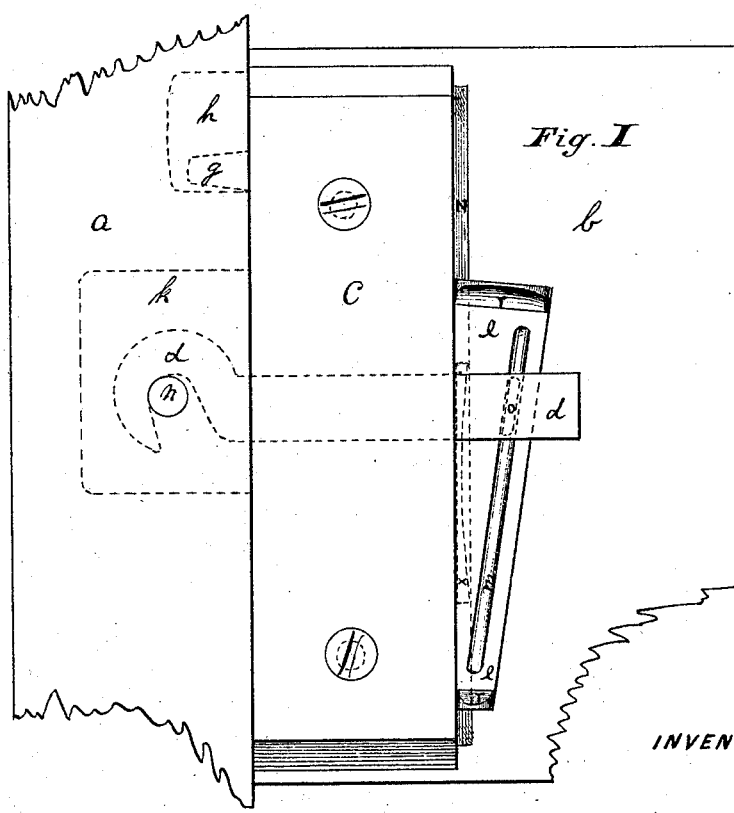
Fig. I
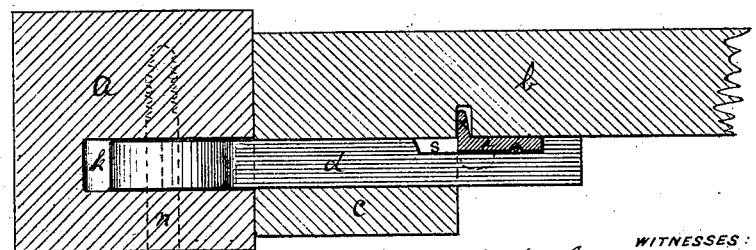
Fig. II
INVENTOR:
Edward F. Gilbert
WITNESSES:
A. P. Cowles
J. Van Otten

United States Patent Office.

EDWARD F. GILBERT, OF LYONS, NEW YORK.

Letters Patent No. 108,472, dated October 18, 1870.

IMPROVEMENT IN BEDSTEAD FASTENINGS.

The Schedule referred to in these Letters Patent and making part of the same.

I, EDWARD F. GILBERT, of Lyons, Wayne county and State of New York, have invented certain improvements in Bedstead Fastenings, of which the following is a specification.

The object of my improvement is to furnish a hook for fastening the side-rails of a bedstead to the head and foot-boards, that will be simple in its construction, strong, cheap, easily applied, and that will have plenty of draught.

Description.

Figure 1 represents a side view of the hook as applied.

Figure 2 represents a top or edge view as applied.

Corresponding letters denote separate parts:

$a$ the bed-post.
$b$ the side-rail.
$c$ the cleat over the hook.
$d\ d$ the hook.
$e$ the wedge or key.
$m$ the groove in the wedge or key.
$o$ the flange on the hook fitting into the groove $m$ in the wedge.
$x$ the flange on the wedge running in the groove $z$ across the side-rail $b$.
$r\ r$ the flanges on the ends of the wedge $e$.
$s$ the slot on the under side of the hook $d$.
$k$ the mortise in post $a$ for the hook.
$n$ the pin over which the hook catches.
$q$ the dowel in the end of rail $b$.
$h$ the mortice in the post $a$ for the dowel $q$.

The wedge $e$ is intended to lie with the flange running lengthwise in the groove across the rail $b$.

The hook $d$ sits across the wedge $e$, with the slot $s$ over the wedge, and with the small flange $o$ sitting in the groove $m$ in the wedge.

Over across the hook goes the cleat $c$ between the wedge and the hook end, and is made fast to the rail $b$.

When the wedge is driven down the hook is drawn back and the strain taken off from the cleat by the flange running in the groove across the rail. When driven up, the flange acts to hold the wedge to the cleat, and the small flange running in the groove in the wedge acts to throw the hook out.

The flanges $r\ r$, across the ends of the wedge $e$, are for the purpose of enabling the wedge to be driven in and out with ease.

Claim.

I claim as my invention—

A wedge or key, with a flange on the under side running lengthwise in a slot across the rail, and with a groove on the opposite side, in combination with a slot and small flange on the hook, for the purpose of a bed fastening.

EDWARD F. GILBERT.

Witnesses:
A. J. COWLES,
J. W. VAN ETTEN.